es Patent Office 3,063,959
Patented Nov. 13, 1962

3,063,959
ALDOL CONDENSATION PRODUCT-PHENOL ALDEHYDE CONDENSATION PRODUCT AND METHOD FOR MAKING SAME
Guido Max Rudolf Lorentz, Frankfurt am Main, Germany, assignor to Farbwerke Hoechst Aktiengesellschaft vormals Meister Lucius & Brüning, Frankfurt am Main, Germany, a corporation of Germany
No Drawing. Filed Jan. 6, 1960, Ser. No. 716
Claims priority, application Germany Jan. 10, 1959
11 Claims. (Cl. 260—43)

The present invention relates to a process for the manufacture of hardenable synthetic resins.

It is already known to prepare various hardenable synthetic resins by the condensation of phenol with furfural. It is also known to work up phenol resins with furfural or furfuryl alcohol resins into hardenable synthetic resins.

Now I have found a process for the preparation of hardenable synthetic resins which after having been hardened yield masses that are particularly well resistant to the action of chemical substances. In this process at least one condensation product (A) of furfural and at least one other aldehyde which condensation product has been prepared in known manner is reacted with at least one resin (B) which has been prepared in known manner from at least one phenolic component and at least one aldehyde.

The condensation products (A) of furfural and aldehyde are obtained by the reaction of furfural with at least one low molecular weight aldehyde containing 2 to 12 carbon atoms, for example propionic aldehyde, butyraldehyde, pentanal, hexanal and crotonaldehyde, and preferably with acetaldehyde. Products obtained by the condensation of 1 mol of furfural with an aldehyde mixture consisting of 0.1 to 0.9 mol of acetaldehyde and 0.9 to 0.1 mol of a saturated or unsaturated aliphatic aldehyde containing 3 to 12 carbon atoms and/or with an aromatic aldehyde of the benzene or naphthalene series, for example phenyl-acetaldehyde or α- or β-naphthyl acetaldehyde, can also be used with particular advantage in the process of the invention. The preparation of the condensation products (A) of furfural and aldehyde is brought about by the reaction of furfural with at least one aldehyde having 2 to 12 carbon atoms and containing reactive hydrogen atoms that are accessible to the aldol condensation, the reaction being carried out by means of alkaline or weakly acid catalysts, advantageously in a pH range of 8 to 9 or 4 to 6, respectively, and preferably while heating. Condensation products of furfural and aldehyde can, for example, be prepared by the following specific processes: 1 mol of furfural and 1 mol of freshly distilled acetaldehyde are mixed together, and 0.01 mol of sodium hydroxide in the form of a solution of 4% strength in a mixture of methanol and water is slowly added. When the exothermic reaction has ceased, the whole is heated for a further 3 hours under reflux, then neutralized, and the water is removed. 1 mol of furfural and 1 mol of freshly distilled butyraldehyde are mixed together, and 0.01 mol of sodium hydroxide in the form of a solution of 4% strength in a mixture of methanol and water is slowly added. When the exothermic reaction has ceased, the whole is heated for a further 3 hours under reflux, then neutralized, and the water is removed. 1 mol of furfural is mixed with 0.9 mol of freshly distilled acetaldehyde and 0.1 mol of freshly distilled butyraldehyde, and the whole is condensed as described above.

As alkaline catalysts there may, for example, be used hydroxides or carbonates of alkali metals or of alkaline earth metals of organic bases or salts of an organic, preferably a strong organic, base with an organic, preferably a weak organic acid. As compounds of this kind there may, for example, be mentioned potassium hydroxide, sodium hydroxide, calcium hydroxide, barium hydroxide, piperidine, cyclohexylamine and piperidine acetate. As acid catalysts there may be mentioned inorganic or strong organic acids or substances which under the reaction conditions give an acid reaction, in particular organic sulfonic acids such as para-toluene-sulfonic acid.

Preferably, an excess of furfural is used. The furfural may, for example, be used in an excess of 0.1 to 0.3 mol calculated on the other aldehyde or the total quantity of the other aldehydes. Alternatively, one to three mols of the other aldehyde or aldehydes may be used per one mol of furfural. The reaction is carried out at temperatures within the range of about 10 to about 150° C., preferably of about 20 to about 60° C.

The reaction is carried out in such a manner that in the case acetaldehyde is used the reaction products obtained are substantially furylacrolein.

The reaction products can be purified by heating them in vacuo and, if desired, by distilling them in vacuo or by subjecting them to a steam distillation. The starting products that have not undergone conversion are thereby eliminated. Before the resulting reaction products are subjected to a further reaction they may be admixed with furfural, preferably a quantity of furfural not exceeding 30% by weight calculated on the purified condensation product, or a batch that has been prepared with an excess of furfural may be treated only to such an extent that it contains about 30% by weight of free furfural.

Especially in cases in which the reaction is carried out on an industrial scale there are obtained, in addition to the above-defined condensation products of furfural and aldehyde, certain portions of resins of higher molecular weight, which do, however, not disturb the subsequent working up and which need not be separated.

As resins (B) obtained from at least one phenolic component and at least one aldehyde there are used either so-called novolaks, i.e. known phenol resins which are obtained by acid condensation and which are reversibly meltable, or preferably phenol resins that are hardenable with an acid catalyst or by the action of heat and which are called resols. By phenolic component there is to be understood such a substance carrying an aromatic hydroxyl group as is generally used for the preparation of phenol resins such as resols or novolaks and as can be reacted with formaldehyde, for example phenol, resorcinol, cresols, xylenols, dihydroxy-diphenyl-methane and dihydroxy-diphenyl-dimethyl-methane. There may also be used phenolic substances obtained by the condensation one or more of the above-mentioned phenols with saturated or unsaturated hydrocarbons, provided they are still capable of reacting with formaldehyde, for example nonyl phenol, allyl phenol, the reaction product of 1 mol of butadiene and 2 mols of phenol and products obtained by the reaction of paraffines containing 6 to 20 carbon atoms with phenol under the action of Friedel-Crafts' catalysts. The preparation of condensation products of aromatic hydroxy compounds and aldehydes is described, for example, by Carleton Ellis in "The Chemistry of Synthetic Resins," Reinhold Publishing Corporation, New York, 1935, and by T. S. Carswell in "Phenoplasts," Interscience Publishers, Inc., New York, 1947.

As aldehyde components suitable for use in preparing the resins (B) there may be used saturated and unsaturated aliphatic aromatic and heterocyclic aldehydes containing up to 10 carbon atoms such as acetaldehyde, acrolein, crotonaldehyde and furfural, especially formaldehyde.

In the reaction of the condensation product (A) of furfural and at least one other aldehyde with the condensation product (B), (A) and (B) may be used in a proportion of about 95:5 to 5:95 parts by weight respectively. There are preferred resins that have been prepared by a reaction in which a great proportion of the condensation product (A) of furfural and at least one other aldehyde was present. The above-mentioned reaction of the two condensation products is carried out in the presence of the same catalysts and under the same reaction conditions as have been described above with reference to the preparation of the condensation product (A) of furfural and at least one other aldehyde.

It has also been found that the resins containing a great portion, preferably 60 to 95%, of condensation product (A) have an extraordinarily good resistance to the action of alkalis if they are hardened, if desired with the addition of inert fillers, as will be described below.

It is known that phenol resins have a poor resistance to alkalis and that this property has to be improved by the addition of appropriate substances, for example halohydrin. However, the products treated in that way do not possess the particularly good resistance to alkalis and at the same time the good resistance to other chemical agents, for example acids and solvents or oxidants and the high degree of mechanical strength the products prepared by the process of the invention possess.

It has also been found that the products obtained by the condensation of the condensation product (A) of furfural and at least one other aldehyde and the phenol resin (B) can be hardened within several hours, for example 20 to 50 hours, in the presence of acid catalysts, in particular organic acids such as sulfonic acids, for example para-toluene sulfonic acid, if desired with the admixture of one or more inert fillers such as coke powder, synthetic graphite, quartz powder, natural or precipitated barium sulfate, silicon carbide, ferro-silicon, in a quantity of up to 80% calculated upon the total weight of the mixture without any further supply of heat being necessary. There are thus obtained resins which after having been hardened have a great chemical resistance and which are suitable for use, for example, in the preparation of linings by means of acid proof bricks based on ceramic materials or carbon, which linings, in addition to good chemical properties and a great hardness and strength, have an extraordinarily good resistance to alkaline and acid reagents. It is also possible to use the resins obtained according to the invention, if desired with the addition of fine-grained inert fillers of the type described above and diluted in a solvent, as stoving lacquer which constitutes an excellent protective layer on apparatus of any kind such as vessels and tubes that are exposed to chemical stress. By the addition of preferably 5 to 35% of reaction products of polyvinyl alcohol and aldehyde, in particular polyvinyl acetals, for example polyvinyl butyral, further properties, in particular the adhesiveness and the elastic properties of the aforesaid stoving lacquers can be improved.

The following examples serve to illustrate the invention but they are not intended to limit it thereto, the parts being by weight unless otherwise stated.

*Example 1*

1 mol of furfural and 1 mol of freshly distilled acetaldehyde are mixed together, and 0.01 mol of sodium hydroxide in the form of a solution of 4% strength in a mixture of methanol and water is slowly added. When the exothermic reaction has ceased, the whole is heated for a further 3 hours under reflux, then neutralized, and the water is removed. The reaction product consists primarily of furyl acrolein.

80 parts of the crude furyl acrolein prepared as described above and 20 parts of a phenol resin obtained by condensing 1 mol of phenol with 1.1 mols of formaldehyde under reflux with the addition of an organic base such as cyclohexylamine, are subjected to a distillation under reduced pressure. The condensation is carried out either in a weakly alkaline medium having a pH value of 8 to 9 or in a weakly acid medium having a pH value of 6 to 4. After the desired degree of viscosity, which in the present case is 500 centipoises, has been obtained the distillation under reduced pressure which is a common condensation is interrupted, the reaction mixture is, if desired, neutralized and the resulting new resin is washed with warm water. 20 to 60 parts by weight of the resin that has thus been obtained are mixed with 80 to 40 parts by weight of an inert filler which contains 0.5 to 10% by weight, calculated on the resin to be hardened, of an acid catalyst, for example para-toluene sulfonic acid. As inert fillers there may be used coke powder, synthetic graphite, quartz powder, natural or precipitated barium sulfate, silicon carbide, ferro-silicon or other appropriate inert fillers. The mixture consisting of the condensation product, the inert filler and the hardener is molded into cylinders and left for about 24 hours. After this time the hardening is practically complete. The products that form have a Shore hardness of about 70 (measured with Shore hardness tester D) and extraordinarily good chemical resistance. Bodies of this kind can be exposed to the action of cold or hot sodium hydroxide solution, cold or hot sulfuric acid of up to 80% strength or bleaching agents, without any considerable chemical attack taking place, already 24 hours after they have been subjected to their ulterior application, for example the filling up of joints of acid proof brickwork. By the term "without any considerable chemical attack taking place" there is to be understood that the loss of weight brought about by boiling the products for one day in the above-mentioned agents at the boiling point of the latter does not exceed 2% by weight. The cylinders that have been mentioned above have a height of 25 mm. and a diameter of 25 mm.

*Example 2*

40 parts of a phenol resin (ratio of phenol to formaldehyde 1:1.8) prepared by a condensation comprising an alkaline and an acid condensation stage and 60 parts of the condensation product of furfuryl and acetaldehyde described above are reacted in the manner described in Example 1. In this experiment, too, there is obtained a resin which can be admixed with inert fillers and acid hardeners and which after hardening for 24 hours at room temperature is resistant to the greatest chemical stress.

*Example 3*

60 parts of a so-called novolak are condensed in the manner described in Example 1 with 40 parts of a condensation product of 1 mol of furfural, 0.25 of acetaldehyde and 0.25 mol of butyraldehyde. The resulting resin is suitable as stoving lacquer after having been diluted with appropriate diluents, for example acetone and aliphatic alchohls such as methanol, the butanols and auryl alcohols, and, if desired, after the addition of appropriate pigments, for example titanium dioxide, red iron oxide, silicon carbide, ferrosilicon and synthetic graphite. The coatings that are obtained after baking for 1 hour at 180° C. are extraordinarily resistant to the action of chemical substances. They are perfectly resistant to the action of lyes of any concentration as well as to the action of acids, for example sulfuric acid of 70% strength, hydrochloric acid of any concentration and phosphoric acid of 80% strength.

*Example 4*

50 parts of the condensation product of furfural and acetaldehyde that has already been described, 40 parts of a phenol resin obtained by a two-stage condensation process from 1 mol of phenol and 2 mols of formaldehyde and 10 parts of a resorcinol resin obtained by the condensation of 1 mol of resorcinol and 0.6 mol of formaldehyde are reacted in vacuo by common condensation and with the elimination of the volatile portions until the desired degree of viscosity, for example a viscosity within the range of 100 centipoises to 5000 centipoises —measured at 20° C.—is attained. The resin which forms can be used as binding agent for stoving lacquers as well as in admixture with inert fillers and acid hardeners for the preparation of, for example, shaped bodies. Due to the resorcinol resin that has been aded an extraordinarily quick reaction takes place.

In every case it is possible to elastify the aforesaid products by adding polymers which are soluble in the above-mentioned resins, for example the reaction products of aldehydes with polyvinyl alcohol, in particular polyvinyl butyral. Such an elastification is in particular desirable when the resinous co-condensation products prepared by the process of the invention are to be used as stoving lacquers.

I claim:

1. A method of making a resin, which resin is hardenable in the presence of an acid catalyst to a chemically inert composition, which comprises condensing at a pH between 4 and 9 (A) at least one aldol condensation product of furfural and an aldehyde having 2 to 12 carbon atoms with (B) at least one condensation product of a compound having at least one aromatic —OH group and at least one aldehyde having up to 10 carbon atoms.

2. A method as in claim 1 wherein said aldol condensation product is furyl acrolein.

3. A method as in claim 2 wherein said condensation product (B) is a phenol-formaldehyde resol.

4. A method as in claim 3 wherein 95 to 5 parts by weight of furyl acrolein are condensed with 5 to 95 parts by weight of phenol-formaldehyde resol.

5. A hardenable resin prepared according to claim 1.

6. The method of making a hardened chemically inert composition which comprises condensing at a pH between 4 and 9 (A) at least one aldol condensation product of furfural and an aldehyde having 2 to 12 carbon atoms with (B) at least one condensation product of a compound having at least one aromatic —OH group and at least one aldehyde having up to 10 carbon atoms, and curing the resulting condensate in the presence of an acid catalyst.

7. A method as in claim 6 wherein said acid catalyst is a sulfonic acid.

8. A method as in claim 6 wherein said acid catalyst is p-toluene sulfonic acid.

9. A method as in claim 6 wherein 20 to 60 parts by weight of said resulting condensate are combined with 80 to 40 parts by weight of at least one inert filler before curing in the presence of an acid catalyst.

10. A hardened resin prepared according to claim 6.

11. A hardened resin prepared according to claim 9.

References Cited in the file of this patent

UNITED STATES PATENTS

| | | |
|---|---|---|
| 1,873,599 | Kappeler | Aug. 23, 1932 |
| 2,264,034 | Allen | Nov. 25, 1941 |
| 2,363,829 | Caplan et al. | Nov. 28, 1944 |
| 2,660,573 | Lantz et al. | Nov. 24, 1953 |